UNITED STATES PATENT OFFICE.

JULIEN DEBY, OF LONDON, ENGLAND.

REGENERATIVE PROCESS FOR EXTRACTING COPPER AND SILVER FROM SULPHURETED ORES.

SPECIFICATION forming part of Letters Patent No. 240,309, dated April 19, 1881.

Application filed September 6, 1880. (No model.)

*To all whom it may concern:*

Be it known that I, JULIEN DEBY, of London, England, civil engineer, have invented a new and useful Regenerative Process for Extracting Copper and Silver from Pyrites or Sulphureted Ores, which process is fully set forth in the following specification.

This invention has reference to the separation of copper and silver in the wet way, by lixiviation and precipitation, and has for its object more particularly to effect the separation economically with as little expenditure of labor and loss or consumption of materials as possible under the circumstances.

In accordance with the improved process, the pyrites is treated in a crude or uncalcined state (prior calcination, heating, or roasting being not required) with solution of ferric sulphate. The liquor used to dissolve out the copper and silver in the ore, is not, after the precipitation of these metals, allowed to go to waste, but is used again and again, the salts contained therein being constantly regenerated or brought into condition for acting anew upon the ore. The regeneration is effected by gases, in the production of which pyrites may be employed. The process is practically independent of water-supply beyond the first outlay, and the consumption of fuel and reagents is reduced to a minimum.

Ferric sulphate has, when used in proper proportions, (these varying with the ore to be treated) the property of acting upon and dissolving the sulphides of copper and silver without acting upon the iron sulphides which accompany them. This property is utilized in the present invention. The crude ore is lixiviated with a liquor containing ferric sulphate, which may be obtained as hereinafter described, and by means of the said liquor copper and silver are extracted in a soluble state. The silver is first precipitated, and afterward the copper.

The regeneration or change of the ferrous into ferric salt is effected by means of sulphurous acid, the latter being produced by burning pyrites in a furnace or by other suitable means.

The best method of carrying out the process is as follows: A quantity of the crude crushed ore is mixed with dry ferrous sulphate, and the whole made into a heap or placed in tanks and watered with ordinary fresh water. The liquid, after percolating through the mass of mixed crude ore and ferrous sulphate, is collected in a tank or reservoir situated at a lower level than the bottom of the heap or tank of ore. This liquor, consisting principally of ferrous sulphate, (which in this form is without sensible useful action in the process,) is now treated to bring it into condition for dissolving out the copper and silver from the crude ore as follows:

*Conversion of the ferrous into ferric liquor.—* This conversion is effected by means of an ordinary condensing-tower and an ordinary pyrites-burner, the latter placed below the tower and arranged to discharge into it at the bottom. The burner, being supplied with pyrites, as required, furnishes the sulphurous-acid gas. The ferrous liquor is pumped or forced into the top of the condensing-tower, and, percolating through the layers of coke tiles or other materials therein, meets in its descent the vapors and gases from the burner, and is then and there converted into ferric liquor. This ferric liquor is collected and carried off from the foot of the tower by suitable means.

*Continuous process.—* The crude ore, crushed as before described, and placed in heaps or tanks at the will of the operator, is watered with the ferric liquor escaping from the foot of the condensing-tower. This liquor, percolating through the ore, acts upon the sulphides of copper or copper and silver, but not upon the iron sulphides, and extracts considerable amounts of copper and silver as sulphates. If the ore contains silver, this is first precipitated from the cupreous and argentiferous liquor as it escapes from the heap or tank of ore, by making the same to pass through a tank containing metallic copper, (ordinary precipitate will answer,) upon which the silver precipitates. The cupreous liquor is then collected into tanks, in which the copper is precipitated in a metallic state on iron, or it may be thrown down as a sulphide by means of sulphureted hydrogen, as is usually done by known methods. After precipitation of the copper, the liquor remaining is taken to the top of the condensing-tower and allowed to percolate through it, in order to be there regenerated, after which it is again fit for acting upon further supplies of pyrites. The regenerated ferric liquor is now used to water other heaps of crude crushed pyrites, the silver and copper precipitated, the remaining liquor again passed through the condensing-tower, to be regenerated or reoxidized, and the operation proceeds, as before, continuously. The same liquors may thus be employed an indefinite number of times, which makes the process a regenerative one, and as such remarkably economical, the waste of ferrous sulphate and water being reduced to a minimum.

It is obvious that unless silver is to be collected the first precipitation need not be used.

I am aware that ferric sulphate has been employed in the extraction of silver and copper from their ores, and that the waste liquors have been regenerated for reuse; but the regeneration has never been effected by means of sulphurous acid, as described in the above specification.

What I claim, therefore, and desire to secure by Letters Patent of the United States, is—

1. The combined method of extracting copper or copper and silver from their sulphide ores and regenerating the resulting liquors, which consists in lixiviating the raw ore with a solution of ferric sulphate, precipitating the metallic silver and copper from the mixed ferrous sulphate solution which results, and thereafter regenerating the ferrous to ferric solution with sulphurous-acid gas for reuse, as described.

2. In the extraction of copper or copper and silver from their sulphide ores by means of ferric sulphate solution, as described, the method of regenerating the iron sulphate used in lixiviation, which consists in subjecting the ferrous sulphate solution to the fumes or gases of sulphurous acid, whereby its conversion into ferric sulphate is effected, all substantially as described.

JULIEN DEBY.

Witnesses:
E. G. CROWE,
   *Winchester House, Old Broad Street.*
ALFRED E. NICHOLS,
   54 *Old Broad Street, London.*